US009150006B2

(12) United States Patent
Neill et al.

(10) Patent No.: US 9,150,006 B2
(45) Date of Patent: Oct. 6, 2015

(54) LAMINATION PROCESS OPTIMIZATION UTILIZING NEOPENTYL GLYCOL-MODIFIED POLYESTERS

(75) Inventors: Ryan Thomas Neill, Kingsport, TN (US); Michael Eugene Donelson, Kingsport, TN (US); Bryan Steven Bishop, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 671 days.

(21) Appl. No.: 13/167,123

(22) Filed: Jun. 23, 2011

(65) Prior Publication Data

US 2012/0328849 A1 Dec. 27, 2012

(51) Int. Cl.

| | |
|---|---|
| ***B32B 7/02*** | (2006.01) |
| ***B32B 27/36*** | (2006.01) |
| ***B32B 37/18*** | (2006.01) |

(52) U.S. Cl.

CPC ............... *B32B 27/36* (2013.01); *B32B 37/185* (2013.01); *B32B 2307/554* (2013.01); *B32B 2309/02* (2013.01); *B32B 2309/04* (2013.01); *B32B 2309/105* (2013.01); *B32B 2309/12* (2013.01); *B32B 2367/00* (2013.01); *B32B 2607/00* (2013.01); *Y10T 428/24802* (2015.01); *Y10T 428/24967* (2015.01); *Y10T 428/26* (2015.01); *Y10T 428/31909* (2015.04)

(58) Field of Classification Search

USPC ...................................................... 428/195.1

See application file for complete search history.

(56) References Cited

U.S. PATENT DOCUMENTS

| | | | |
|---|---|---|---|
| 2,991,273 | A | 7/1961 | Hechelhammer et al. |
| 2,999,835 | A | 9/1961 | Goldberg |
| 2,999,846 | A | 9/1961 | Schnell et al. |
| 3,028,365 | A | 4/1962 | Schnell et al. |
| 3,148,172 | A | 9/1964 | Fox |
| 3,153,008 | A | 10/1964 | Fox |
| 3,169,121 | A | 2/1965 | Goldberg |
| 3,207,814 | A | 9/1965 | Goldberg |
| 3,271,367 | A | 9/1966 | Schnell et al. |
| 3,396,067 | A | 8/1968 | Schafer |
| 3,502,620 | A | 3/1970 | Caldwell |
| 3,546,008 | A | 12/1970 | Shields et al. |
| 3,734,874 | A | 5/1973 | Kibler et al. |

(Continued)

FOREIGN PATENT DOCUMENTS

| | | | |
|---|---|---|---|
| DE | 4 415 432 | A1 | 11/1995 |
| EP | 0 271 288 | A2 | 6/1988 |

(Continued)

OTHER PUBLICATIONS

ASTM D3433.

(Continued)

*Primary Examiner* — Bruce H Hess
*Assistant Examiner* — Christopher Polley
(74) *Attorney, Agent, or Firm* — Tammye L. Taylor

(57) ABSTRACT

Thermoplastic articles made from polyesters modified by neopentyl glycol laminate more quickly than cyclohexanedimethanol-modified versions yet retain the properties that make modified polyesters the material of choice in this market—water-like color and clarity, high impact strength, low lamination temperature and low flammability. For situations where a faster cycle time is not needed, articles laminated with neopentyl glycol-modified polyesters can alternatively be manufactured at lower temperatures.

14 Claims, 2 Drawing Sheets

(56) References Cited

U.S. PATENT DOCUMENTS 3,772,405 A 11/1973 Hamb
4,025,492 A 5/1977 Binsack et al.
4,029,837 A 6/1977 Leatherman
4,111,846 A 9/1978 Elliott, Jr.
4,123,436 A 10/1978 Holub et al.
4,136,089 A 1/1979 Bier et al.
4,156,069 A 5/1979 Prevorsek et al.
4,176,224 A 11/1979 Bier et al.
4,188,314 A 2/1980 Fox et al.
4,194,038 A 3/1980 Baker et al.
4,208,527 A 6/1980 Horlbeck et al.
4,217,440 A 8/1980 Barkey
4,228,209 A 10/1980 Chavannes
4,233,196 A 11/1980 Sublett
4,238,593 A 12/1980 Duh
4,263,364 A 4/1981 Seymour et al.
4,289,818 A 9/1981 Casamayor
4,391,954 A 7/1983 Scott
4,430,484 A 2/1984 Quinn
4,433,070 A 2/1984 Ross et al.
4,452,933 A 6/1984 McCready
4,465,820 A 8/1984 Miller et al.
4,474,918 A 10/1984 Seymour et al.
4,503,023 A 3/1985 Breck et al.
4,544,584 A 10/1985 Ross et al.
4,733,488 A 3/1988 Yokoyama et al.
4,786,692 A 11/1988 Allen et al.
4,786,693 A 11/1988 Hefner, Jr.
4,918,156 A 4/1990 Rogers
4,946,932 A 8/1990 Jenkins
4,981,898 A 1/1991 Bassett
4,982,014 A 1/1991 Freitag et al.
5,010,162 A 4/1991 Serini et al.
5,051,654 A 9/1991 Nativi et al.
5,055,076 A 10/1991 Mori et al.
5,059,470 A 10/1991 Fukuda et al.
5,091,258 A 2/1992 Moran
5,228,925 A 7/1993 Nath et al.
5,286,290 A 2/1994 Risley
5,290,631 A 3/1994 Fleury et al.
5,413,840 A 5/1995 Mizuno
5,442,036 A 8/1995 Beavers et al.
5,443,912 A 8/1995 Olson
5,445,871 A 8/1995 Murase
5,461,120 A 10/1995 Mason et al.
5,478,896 A 12/1995 Scott
5,492,589 A 2/1996 Mizuno
5,527,989 A 6/1996 Leeb et al.
5,543,488 A 8/1996 Miller et al.
5,552,495 A 9/1996 Miller et al.
5,583,394 A 12/1996 Burbank et al.
5,633,340 A 5/1997 Hoffman et al.
5,643,666 A 7/1997 Eckart et al.
5,646,237 A 7/1997 George et al.
5,654,347 A 8/1997 Khemani et al.
5,688,738 A 11/1997 Lu
5,696,176 A 12/1997 Khemani et al.
5,709,929 A 1/1998 Venema
5,709,940 A 1/1998 George et al.
5,739,463 A 4/1998 Diaz et al.
5,742,006 A 4/1998 Grupp et al.
5,814,393 A 9/1998 Miyaake et al.
5,834,118 A 11/1998 Ranby et al.
5,894,048 A 4/1999 Eckart et al.
5,957,564 A 9/1999 Bruce et al.
5,958,539 A 9/1999 Eckart et al.
5,972,445 A 10/1999 Kimura et al.
5,998,028 A 12/1999 Eckart et al.
6,025,069 A 2/2000 Eckart et al.
6,043,322 A 3/2000 Scott et al.
6,136,441 A 10/2000 MacGregor et al.
6,162,890 A 12/2000 George et al.
6,214,155 B1 4/2001 Leighton
6,322,862 B1 11/2001 Sakai
6,637,906 B2 10/2003 Knoerzer et al.
6,698,085 B2 3/2004 Stevenson et al.
6,743,327 B2 6/2004 Schober
6,803,110 B2 10/2004 Drees et al.
6,896,966 B2 5/2005 Crawford et al.
6,917,301 B2 7/2005 Blum et al.
6,924,349 B2 8/2005 Lee et al.
6,949,825 B1 9/2005 Guenther et al.
7,008,700 B1 3/2006 Goodson et al.
7,022,388 B2 4/2006 Hashimoto et al.
7,038,372 B2 5/2006 Yuki et al.
7,074,501 B2 7/2006 Czeremuszkin et al.
7,081,300 B2 7/2006 Laurence et al.
7,118,799 B2 10/2006 Crawford et al.
7,298,072 B2 11/2007 Czeremuszkin et al.
7,510,768 B2 3/2009 Crawford et al.
7,550,057 B1 6/2009 Goodson et al.
7,691,470 B2 4/2010 Goodson et al.
7,704,605 B2 4/2010 Crawford et al.
7,740,941 B2 6/2010 Crawford et al.
7,906,211 B2 3/2011 Crawford et al.
7,906,212 B2 3/2011 Crawford et al.
8,217,869 B2 7/2012 Weisberg et al.
8,287,991 B2 10/2012 Donelson et al.
2002/0055586 A1* 5/2002 Dalgewicz et al. ............. 525/64
2003/0152775 A1 8/2003 Gorny et al.
2004/0209020 A1 10/2004 Castiglione et al.
2005/0137542 A1 6/2005 Underhill et al.
2006/0249715 A1 11/2006 Salyer et al.
2008/0085390 A1 4/2008 Neill et al.
2009/0017320 A1 1/2009 Donelson et al.
2009/0105380 A1 4/2009 Neill et al.
2010/0174030 A1 7/2010 Crawford et al.
2011/0144266 A1 6/2011 Crawford et al.
2012/0157636 A1 6/2012 Neill et al.

FOREIGN PATENT DOCUMENTS

EP 0 408 042 A2 1/1991
EP 0 587 353 A1 3/1994
EP 0 595 413 A1 5/1994
GB 1 356 004 6/1974
GB 1 599 230 A 9/1981
GB 2 344 596 A 6/2000
JP 09-052338 2/1997
JP 2004-276320 A 10/2004
WO WO 94 25502 A1 11/1994
WO WO 01/53393 A1 7/2001
WO WO 02/068511 A1 9/2002
WO WO 2008/042224 A1 4/2008
WO WO 2008/042226 A1 4/2008

OTHER PUBLICATIONS

ASTM D256.

ASTM D1925.

ASTM D3418.

ASTM D2857-95.

ASTM G155.

ASTM D1238.

ASTM D1003 Method A.

ASTM 4603.

Wilfong, R. E., “Linear Polyesters”; Journal of Polymer Science, vol. 54, pp. 385-410, (1961).

Mohn, R.N., et al.; “Polyester-Polycarbonate Blends. III. Polyesters Based on 1,4-Cyclohexanedimethanol/Terephthalic Acid/ Isophthalic Acid”; Journal of Applied Polymer Science, vol. 23, pp. 575-587, (1979).

Research Disclosure 22921, May 1983, Disclosed Anonymously (209, 136).

Co-pending U.S. Appl. No. 13/487,474 dated Jun. 4, 2012.

Notification of Transmittal of the International Search Report and the Written Opinion of the International Search Authority with a mailing date of Aug. 9, 2012, International application No. PCT/US2012/ 041455.

(56) References Cited

OTHER PUBLICATIONS

Notification of Transmittal of the International Search Report and the Written Opinion of the International Searching Authority, or the Declaration, for International Application No. PCT/US2008/011727 with Date of Mailing Feb. 13, 2009.
Notification of Transmittal of the International Search Report and the Written Opinion of the International Searching Authority, or the Declaration, for International Application No. PCT/US2007/020859 with Date of Mailing Jan. 28, 2008.
Notification of Transmittal of the International Search Report and the Written Opinion of the International Searching Authority, or the Declaration, for International Application No. PCT/US2007/020869 with Date of Mailing Jan. 25, 2008.
USPTO Office Action dated Jul. 15, 2013 for copending U.S. Appl. No. 13/487,474.
USPTO Office Action dated Jan. 21, 2014 for copending U.S. Appl. No. 13/487,474.
USPTO Office Action dated Oct. 23, 2014 for copending U.S. Appl. No. 13/487,474.

* cited by examiner

LAMINATION PROCESS OPTIMIZATION UTILIZING NEOPENTYL GLYCOL-MODIFIED POLYESTERS

FIELD OF THE INVENTION

This invention pertains to thermoplastic articles made from polyesters modified by neopentyl glycol and methods of preparing the articles.

BACKGROUND OF THE INVENTION

Laminated architectural resin panels made from polyesters modified by cyclohexanedimethanol (CHDM) are utilized by architects and designers who participate in the construction of new buildings and major renovations. However, the high temperatures needed to produce the CHDM modified polyesters can yield panels that have aesthetic defects. The temperature-induced defects are manifest in two ways—as the lamination temperature increases the propensity to burn or degrade some encapsulated inclusions like botanicals or light emitting capacitors also increases. Similarly, as the lamination temperature increases the resin flows more readily and can either distort or break the encapsulated inclusions (an aesthetic defect). FIG. 1 can be used to further explain the aesthetic defects that can be caused by directionally higher lamination temperatures. The platens are parts of the equipment that supply the heat and pressure for lamination. As the temperature of the upper and lower platens (layers "a" and "f") are increased under pressure, the upper and lower laminate surfaces (layers "c" and "e") begin to heat and flow directionally outward as shown. As the laminate surfaces flow outward, the decorative interlayers (layer "d") are pulled with the laminate surfaces. For elastic inclusions like fabrics and printed images on certain film substrates, the outward flow can stretch these layers in an irregular manner causing an undesirable distortion. For non-elastic inclusions like dried botanicals or light emitting capacitors, the outward flow can cause inclusion fracture. Similar effects can occur with layer "b" non-elastic, cross-linked hardcoats can fracture and elastic films containing ultraviolet absorbers can thin in a non-uniform manner causing premature part failure from exterior weathering. Both the distortion and fracture mechanisms are less likely to occur at lower temperature lamination. Hence, a need exists for finding modified polyesters that can be produced more quickly and at lower temperatures.

BRIEF SUMMARY OF THE INVENTION

A first embodiment of the present invention concerns a thermoplastic article obtained by contacting a laminate comprising a first sheet material and a second sheet material with heat and pressure using a heated element which results in the simultaneous bonding of the sheet material;

wherein the first and second sheet materials are formed from a copolyester having an inherent viscosity of 0.5 to 1.2 dL/g, when measured at 25° C. using 0.50 grams of polymer per 100 mL of a solvent consisting of 60 weight percent phenol and 40 weight percent tetrachloroethane comprising:

(i) diacid residues comprising at least 80 mole percent terephthalic acid residues; and (ii) diol residues comprising from 98 to 1 mole percent ethylene glycol residues and from 2 to 99 mole percent residues derived from neopentyl glycol in which the ethylene glycol and neopentyl glycol residues constitute at least 80 mole percent of the diol residues.

Another embodiment concerns a method of producing a thermoplastic article comprising:

laminating a first sheet material and a second sheet material to thereby form the article, wherein the first and second sheet materials are formed from a copolyester having an inherent viscosity of 0.5 to 1.2 dL/g, when measured at 25° C. using 0.50 grams of polymer per 100 mL of a solvent consisting of 60 weight percent phenol and 40 weight percent tetrachloroethane comprising:

(i) diacid residues comprising at least 80 mole percent terephthalic acid residues; and (ii) diol residues comprising from 98 to 1 mole percent ethylene glycol residues and from 2 to 99 mole percent residues derived from neopentyl glycol in which the ethylene glycol and neopentyl glycol residues constitute at least 80 mole percent of the diol residues; and wherein laminating is carried out at a temperature of about 80 to about 300° C. at a pressure of about 5 to about 400 pounds per square inch for a cycle time of about 2 to about 100 minutes.

DETAILED DESCRIPTION

Figure 1:
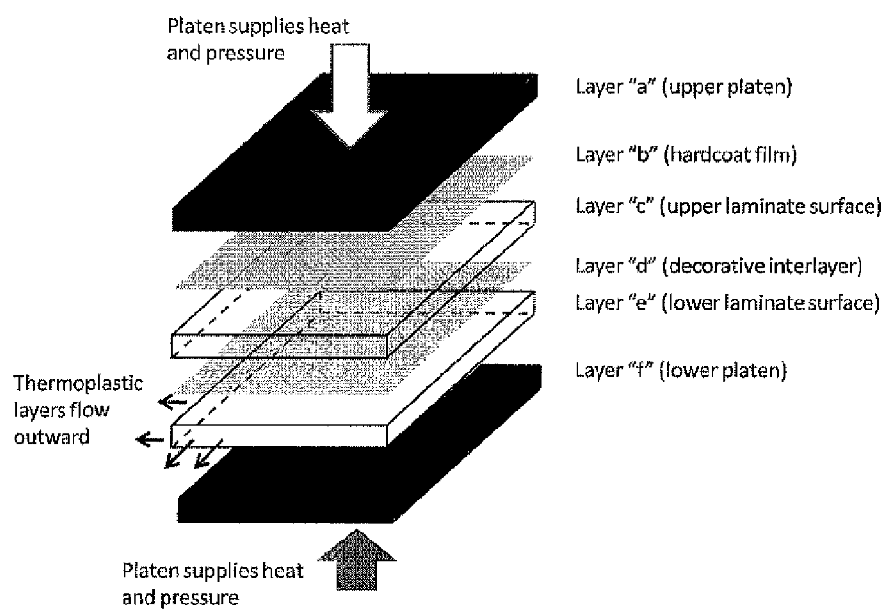
FIG. 1 shows a reduced thermoplastic layer flow through lower lamination temperatures.
Figure 2:
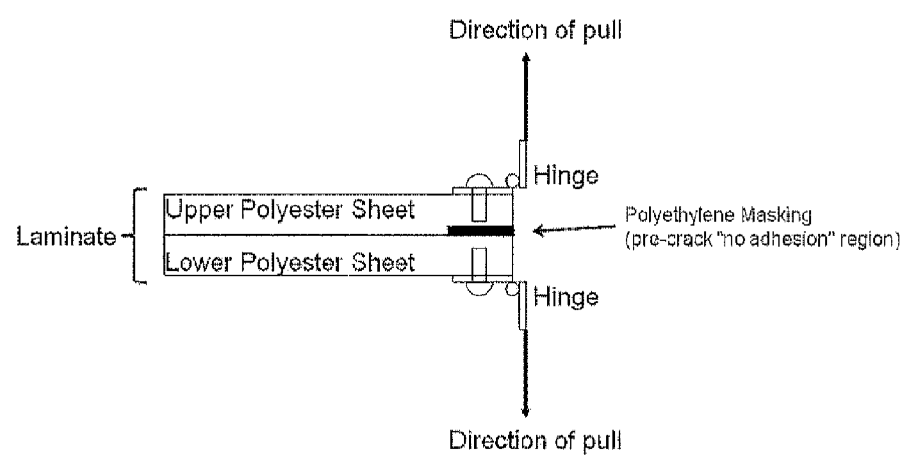
FIG. 2 shows adhesion measurement via modified dual cantilever beam test.

According to an embodiment, the present invention concerns neopentyl glycol (NPG) modified polyesters useful for producing thermoplastic articles such as sheets, films or laminated architectural resin panels, and methods for producing the panels. It has been discovered that polyesters modified by NPG laminate more quickly than CHDM-modified versions yet retain the properties that make modified polyesters the material of choice in this market—water-like color and clarity, high impact strength, low lamination temperature and low flammability. Moreover, articles laminated with NPG-modified polyesters can alternatively be manufactured at lower temperatures.

According to an embodiment a typical thermocompressive lamination procedure includes placing the "book" with articles to be laminated in a heated press with platen temperatures of about 80 to about 300° C., about 90 to about 200° C., about 100 to about 160° C., or even about 105 to about 130° C. and a pressure of about 5 to about 400 pounds per square inch, from about 20 to about 300 pounds per square inch, from about 40 to about 200 pounds per square inch, or even from about 50 to about 150 pounds per square inch for a cycle time of about 2 to about 100 minutes, about 5 to about 90 minutes, about 7 to about 80 minutes, or even about 10 to about 60 minutes, where the temperature and pressure depend on the characteristics of the encapsulant or inclusion and length of the cycle time depends on the thickness of the article being laminated and the total number of articles being laminated when stacked together (called a "book") in one press opening.

A typical layup for the book might include the following layers: a metallic transfer plate, a pressure distribution pad (rubber silicone, paper corrugation, thermally-stable or conductive fabric, etc.), a thin metallic "caul" plate, release film or paper, an optional thin clear extruded copolyester film containing an ultraviolet absorbing additive with an optional matte texture oriented upward (matte texture toward the sheet to be described next) to prevent air entrapment, extruded copolyester plastic sheeting (with or without recycled material content) with matte surface upward, decorative or functional layer to be encapsulated and repeating the layers in reverse to complete the layup to make one laminated structure. Note that a book can be constructed such that several laminates are manufactured in one press opening. Further note that additional layers of extruded copolyester sheeting and inclusions can be added to the laminate such that the inclusions appear in multiple layers and hence show a three dimensional floating effect. Also note that a mold made of metal, plastic or other compositions with a decorative, embossed or textured pattern could be substituted for the flat caul plate described above such that the pattern is imparted onto one or both of the exterior sides of the laminate. Those skilled in the art will be able to describe several variations to the above example.

A typical thermoforming operation for one skilled in the art might include clamping a sheet of copolyester plastic sheeting to a frame, sliding this frame into an oven, allowing the sheet to heat until the surface temperature reached about 220 to about 330° F., about 240 to about 315° F., about 260 to about 300° F., or even about 275 to about 290° F. or until the degree of sag in the middle of the sheet becomes about 1 to about 16 inches, about 3 to about 14 inches, about 5 to about 12 inches, or even about 7 to about 10 inches, pulling the hot sheet out of the oven and stretching the sheet over a mold, applying vacuum as needed to obtain a satisfactory shape and cooling the form with force-circulated air from a fan until the temperature reaches about 55° C.

A typical drape-forming operation for one skilled in the art would include clamping a sheet of extruded copolyester plastic sheeting to a frame, sliding this frame into an oven, allowing the sheet to heat until the surface temperature reached about 220 to about 330° F., about 230 to about 300° F., about 235 to about 290° F., or even about 240 to about 280° F. or until the degree of sag in the middle of the sheet becomes about 1 to about 16 inches, about 2 to about 12 inches, about 3 to about 9 inches, or even about 4 to about 7 inches, pulling the hot sheet out of the oven and allowing the weight of the hot sheet to stretch over a mold and cooling the form with forced-circulated air from a fan until the temperature reaches about 55° C.

A typical line-bending operation for one skilled in the art would include placing a sheet of extruded copolyester plastic sheeting over an electrically-energized heating element with a spacing of about one half of one inch until the thermoplastic sheeting becomes sufficiently pliable (about 200 to about 350° F., about 220 to about 330° F., about 240 to about 310° F., or even about 260 to about 290° F.), mechanically bending the sheet along the pliable edge to the desired angle, and holding the object in place until cool (about 130° F.).

A typical fabrication step for one skilled in the art that could require an elevated temperature might include polishing the edge of a cut sheet of plastic containing copolyesters to achieve a glass-like aesthetic surface by moving the tip of the flame from a butane micro torch about 1 inch away from the surface to be polished with a travel rate of about 1 inch per second along the edge to be polished. Several passes may be needed. Likewise, a heat gun with force-circulated hot air can also be used, where the surface of interest could include either the edge and/or the surface. Note that those skilled in the art can describe several variations to the above example.

One embodiment of the present invention involves manufacturing film, sheet or articles containing NPG-modified polyesters and subjecting the film, sheet or articles to an extended heat history such that one or more layers are thermally fused to form laminated articles that remain clear.

Another embodiment of the present invention involves manufacturing film, sheet or articles containing NPG-modified polyesters and subjecting the film, sheet or articles to an extended heat history such that one or more layers are thermally fused to form laminated articles that become translucent or opaque through the heat-induced crystallization of one or more said layers.

Another embodiment of the present invention involves thermoplastic articles containing NPG-modified polyesters where the articles include, but are not limited to, decorative laminates, functional laminates, thermoformed articles, drape formed articles, line-bent articles or articles that have post-manufacturing fabrication (such as edge or surface polishing with a micro torch, a heat gun, and the like), and the like.

The decorative and functional laminates may include adhesion to the surface of one or more, or encapsulation between two or more, layers of clear thermoplastic film or sheet containing copolyesters and where the insert to be adhered or encapsulated include, but is not limited to, films, fabric, metallic wire, rod, bar, mesh, decorative amorphous metallic surfaces (metallic "macro zeolites"), wood, stone, paper, printed images, vegetation, wood, wood chips, grasses, thatch, flowers, flower petals, wheat, grains, natural papers, glass, crushed glass, pebbles, moss, and the like, or at least one electrically energized device comprising light emitting capacitors (LEC's), light emitting diodes (LED's), printed "circuit boards" or paper that emit light when energized, electrochromic layers, photovoltaics, transmitters, receivers, antennas, electromagnets, electrodes and smart sensors capable of detecting wind speed and direction, temperature, pressure, relative humidity, rainfall, motion, radiation, specific chemical species or combinations thereof, and the like.

These products are intended for use primarily as decorative or functional articles which include, but are not limited to, counter tops, table tops, cabinet doors, game boards, toys, panels for shower stalls, hot tubs, marker boards, indoor and outdoor signs, vanity tops including sink, soap dish, back splash, flooring, billboard signage, backlit bus advertisement, street furniture, bus shelters, visual merchandizing displays, flooring, ceilings, kiosks, smart sensors, decorative walls, partitions, glazing applications, skylights, and the like.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols and diols. These diacids and diols form linear polyesters. The term "glycol" as used in this application includes, but is not limited to, diols, glycols, and/or multifunctional hydroxyl compounds. A multifunctional hydroxyl, such as pentearythritol, forms branched copolyesters. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. Furthermore, as used in this application, the term "diacid" includes multifunctional acids such as branching agents. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

In one embodiment of the invention suitable polyesters include copolyesters commercially available from Artenius, a division of La Seda de Barcelona under the Radicron brand name. These copolyesters comprise repeating units of diacid residues and diol residues. At least 80 mole percent of the diacid residues are terephthalic acid residues. The diacid component of the copolyesters optionally may comprise up to 20 mole percent of one or more other dicarboxylic acid such that the sum of the dicarboxylic acid units is equal to 100 mol percent. Examples of such other dicarboxylic acids include phthalic acid, isophthalic acid, 1,4-, 1,5-, 2,6- or 2,7-naphthalenedicarboxylic acid, 1,3- or 1,4-cyclohexanedicarboxylic acid (which may be cis, trans or a mixture thereof), cyclohexanediacetic acid, trans-4,4'-stilbenedicarboxylic acid, 4,4'-oxydibenzoic acid, 3,3'- and 4,4'-bi-phenyldicarboxylic acids and aliphatic dicarboxylic acids such as malonic, succinic, glutaric, adipic, pimelic, suberic, azelaic, sebacic, nonane, decane, and dodecanedicarboxylic acids. The "residue" of the dicarboxylic acids described herein is that portion of the diacid which constitutes a portion of a diester of the diacid. The diacid residues may be derived from the dicarboxylic acid, dialkyl esters thereof, e.g., dimethyl terephthalate and bis(2-hydroxyethyl)terephthalate, acid chlorides thereof and, in some cases, anhydrides thereof.

In one embodiment of the present invention, the diol component of the copolyesters comprises from 98 to 1 mole percent ethylene glycol residues and 2 to 99 mol percent neopentyl glycol. Up to 20 mole percent, up to 10 mole percent, or up to 5 mol percent of the diol component may be made up of the residues of one or more diols other than ethylene glycol and neopentyl glycol such that the sum of all diol residues is 100 mole percent. Examples of such additional diols include cycloaliphatic diols having 3 to 16 carbon atoms and aliphatic diols having 3 to 12 carbon atoms. Specific examples of such other diols include, but are not limited to, 1,2-propanediol, 1,3-propanediol, 1,4- or 1,3-cyclohexanedimethanol (cis-, trans-, and mixtures thereof), 2-methyl-1,3-propanediol, 1,4-butanediol, 1,5-pentanediol, 1,6-hexanediol, 2,2,4,4-tetramethyl-1,3-cyclobutanediol (trans-, cis- or mixtures thereof), and p-xylylene glycol. In one embodiment of the present invention, the diol component of the copolyesters consists essentially of residues of ethylene glycol and neopentyl glycol wherein the mole ratio of ethylene glycol residues:neopentyl glycol residues is about 5:95 to about 95:5, about 38:62 to about 88:12, or about 50:50 to about 77:23.

Conventional polycondensation processes can be used to prepare the polyesters useful in the present invention. These include direct condensation of the acid(s) with the diol(s) or by ester interchange using lower alkyl esters. In one aspect, the inherent viscosity of the polyesters of the present invention may range from about 0.5 to about 1.2 dL/g or about 0.6 to about 0.9 dL/g at 25° C., measured by dissolving about 0.50 g of the polyester in about 100 mL of a solvent consisting of 60% by weight phenol and 40% by weight tetrachloroethane.

The polymerization reaction to form the polyesters useful in the present invention may be carried out in the presence of one or more conventional polymerization catalysts. Typical catalysts or catalyst systems for polyester condensation are well known in the art. Examples of useful catalyst systems include Ti, Ti/P, Mn/Ti/Co/P, Mn/Ti/P, Zn/Ti/Co/P, Zn/Al, and Li/Al. When cobalt is not used in the polycondensation, copolymerizable toners may be incorporated into the copolyesters to control the color of these copolyesters so that they are suitable for applications in which color may be an important property. In addition to the catalysts and toners, other conventional additives, such as antioxidants, dyes, etc., may be used in the copolyesterifications in typical amounts.

In certain embodiments, one or more branching agents may also be useful in making the polyesters useful in the present invention. The branching agent can be one which provides branching in the acid unit portion of the polyester, or in the glycol unit portion, or it can be a hybrid. Illustrative of such branching agents are polyfunctional acids, polyfunctional glycols and acid/glycol hybrids. Examples include, but are not limited to, tri or tetracarboxylic acids, such as trimesic acid, pyromellitic acid and lower alkyl esters thereof and the like, and tetrols such as pentaerythritol. Also triols such as trimethylolpropane or dihydroxy carboxylic acids and hydroxydicarboxylic acids and derivatives, such as dimethyl hydroxy terephthalate, and the like are useful within the context of this invention. Trimellitic anhydride is a preferred branching agent. The branching agents may be used either to branch the polyester itself or to branch the polyester/polycarbonate blend of the invention.

The polyesters useful in certain embodiments of this invention maybe made by conventional melt processing techniques. For example, pellets of two or more polyesters with different levels of comonomer or additive modification may be mixed and subsequently melt blended on either a single or twin screw extruder to form a homogenous mixture.

In one embodiment of the present invention, the laminate is made from sheet material from which the upper (or outer) layer or surface is formed generally has a thickness in the range of about 0.015 to about 0.500 inch (about 0.38 to about 12.70 mm) or of about 0.050 to about 0.250 inch (about 1.27 to about 6.35 mm). The sheet material from which the lower (or backing) layer or surface is formed typically has a thickness in the range of about 0.015 to about 0.500 inch (about 0.38 to about 12.70 mm) or of about 0.050 to about 0.250 inch (about 1.27 to about 6.35 mm).

In one aspect of the present invention, the thermoplastic article of the present invention may be produced by subjecting the laminate to temperatures and pressures sufficient to cause the upper or lower sheet materials to bond (or fuse) around the object to be encapsulated. Although the upper and lower sheet may also bond to the object to be encapsulated, this is not required for the present invention. However, temperatures which cause decomposition, distortion, or other undesirable effects in the encapsulant should be avoided. Typically, the bonding temperatures are in the range of about 80 to about 218° C. (about 176 to about 425° F.), about 82 to about 200° C. (about 180 to about 392° F.). For certain embodiments of the invention, the temperature has a lower limit of 80, 90, 100, 110, 120, 130, 140, 150, 160, 170, 180, 190, 200, 210, or 220° C. The temperature has an upper limit of 233, 220, 210, 200, 190, 180, 170, 160, 150, 140, 130, 120, 110, 100, or 90° C. For various embodiments of the invention the range of temperature may be any combination of the lower limit of temperature with any upper limit of temperature. The pressures utilized in the bonding or laminating of the thermoplastic article of the invention preferably are in the range of about 0.034 to about 2.41 MPa (about 5 to about 350 pounds per square inch gauge ("psig")). For certain embodiments of the invention, the pressure has a lower limit of 5, 10, 20, 30, 40, 50, 60, 70, 80, 90, 100, 110, 120, 130, 140, 150, 175, 200, 225, 250, 275, 300 or 325 psig. For certain embodiments of the invention, the pressure has an upper limit of 10, 20, 30, 40, 50, 60, 70, 80, 90, 100, 110, 120, 130, 140, 150, 175, 200, 225, 250, 275, 300, 325 or 350 psig. For various embodiments of the invention the range of pressure may be any combination of the lower limit of pressure with any upper limit of pressure.

The temperature for bonding the thermoplastic articles will vary depending, for example, on the particular material or blend employed and the thickness of the sheet materials used, and may be determined by those skilled in the art using the disclosures herein. The pressure will vary depending on the pressure sensitivity of the object being encapsulated. Light emitting capacitor (LEC) panels, as an example, can be pressed at approximately 0.10 MPa (15 psi). The laminate is held at the appropriate temperature and pressure for about 5 to 45 minutes, or until such time as a bond is formed between the upper and lower sheet materials. After 5 to 45 minutes, the bonded/fused thermoplastic article is allowed to cool under pressures from about 0.034 to about 2.41 MPa (about 5 to about 350 psi) or about 0.10 MPa (15 psi), until it cools below the glass transition temperature of the sheet material. In certain embodiments according to the present invention, during the bonding process, the sheet material may be bonded or fused to the object to be encapsulated without the use of an adhesive.

The residence times of about 5 to about 45 minutes are generally applicable to single laminate layup configurations. Multiple laminate layups (called a book), stacked vertically and separated by release papers and caul plates (optional), can also be constructed such that multiple laminates are produced in just one heated platen opening. The residence times for these multiple layup configurations may exceed 45 minutes. Proper residence times for multiple layup configurations may be determined by one of ordinary skill using the disclosures herein. The lower limit of residence time may be 5, 10, 20, 30, 40, 50, 60, 70, or 80 minutes. The upper limit of residence time may be 90, 80, 70, 60, 50, 40, 30, 20, or 10 minutes. For various embodiments of the invention the range of residence times may be any combination of the lower limit of residence time with any upper limit of residence time.

One aspect of the current invention involves the use of relatively low forces in the thermocompressive lamination of pressure-sensitive electrical structures which may cause air entrapment. Typical air removal methods include lamination under a vacuum; pre-drying the raw materials; or creating channels for air escape, such as a matte texture on the sheet surface, matte textured release paper, or including a "glass sheen" PET fabric (available from Danzian) between areas prone to air entrapment. For thicker panels, polymeric thin film shims can be added around the article to be encapsulated to further aid air removal. When using matte sheet, place the matte side facing the encapsulated item. The target "Ra" or surface roughness measurement should be about 10 to about 400 micro inches, about 30 to about 350 micro inches, about 50 to about 300 micro inches, or about 70 to about 250 micro inches, where the preferred surface roughness value depends on the type of inclusion being encapsulated.

For temperature-sensitive objects, additional insulating layers can be added to further protect the sensitive portions of the panel. The insulating layers may be an interior layer that becomes a part of the finished laminated panel or the insulating layers may be external layers that are removed when the laminated panel is removed from the lamination press.

The upper and lower sheet materials used in the manufacture of the thermoplastic articles of the present invention may be the same or different. For example, the upper and lower sheet materials may be produced from different polyesters, polyester/polycarbonate blends, polyvinyl chloride, polyacrylates or polycarbonates, including compositions that contain different additives. When the upper and lower sheet materials are produced from chemically dissimilar materials, the dissimilar materials must be thermally compatible. As used herein, the term "thermal compatibility" means that when layers of the sheet materials are bonded together under conditions of elevated temperature and pressure, the layers undergo approximately equal thermal expansion or contraction such that the solid surface is substantially planar.

The polyesters useful in various embodiments of the invention may contain impact modifiers, stabilizers, nucleating agents, extenders, flame retarding agents, reinforcing agents, fillers, antistatic agents, antimicrobial agents, antifungal agents, self-cleaning or low surface energy agents, mold release agents, scents, colorants, antioxidants, extrusion aids, slip agents, release agents, carbon black, and other pigments, and the like, all and mixtures thereof which are known in the art for their utility in polyesters or polyester/polycarbonate blends. In particular, the use of phosphorous based stabilizers for further color reductions, if needed, is well known in the art.

Some encapsulants may have a sensitivity to moisture when exposed to outdoor environments. In addition to pre-drying the raw materials, the encapsulation of additional moisture barriers, such as a layer of EVOH or nanoclay-impregnated metaxylene diamine ("MXD6"), may be required beyond the copolyester, et al, sheeting already present. These barrier layers can be added to the laminate layup as either a film or co-extruded directly onto the plastic sheeting. Desiccants or other hydrophilic moisture scavengers can also be encapsulated with the panels.

The composition and blends thereof constituting the sheet materials used in the manufacture of the articles and sheeting of the present invention may not be as hard or scratch resistant as may be necessary or desired for certain end uses. For example, an end use in which the exterior surface of the thermoplastic article may be subjected to scratching or abrasion, i.e., in a wall decoration, may require the application of an abrasion-resistant coating to the exterior surface. For example, films consisting of fluorinated hydrocarbons, poly (perfluoroethylene) such as TEDLAR from duPont Chemical Company or oriented poly(ethylene terephthalate) such as MYLAR from duPont Chemical Company may be used to improve both chemical and abrasion resistance. The abrasion resistant film typically has a thickness in the range of about 0.025 to 0.254 mm (0.001-0.01 inch), preferably about 0.051 to 0.178 mm (0.002-0.007 inch), and most preferably about 0.076 mm (0.003 inch). However, abrasion resistant film thinner or thicker than these ranges may be used since the thickness of such film is limited only by the available equipment, cost and functionality considerations. An adhesive optionally may be used between the thermoplastic sheet and the abrasion resistant film.

Alternatively, an abrasion resistant coating may be applied to a plastic film and then the film bearing the abrasion resistant coating may be laminated to one or both sides of the article of the present invention. The film may be selected from a number of thermoplastic materials compatible with the lamination process such as poly(vinyl chloride), PETG copolyester, poly(ethylene terephthalate), poly(methyl methacrylate), polycarbonate, polyester/polycarbonate blends, and the like.

The film thickness may range from about 0.0025 to about 0.381 mm (about 0.001 to about 0.015 inch) or about 0.0762 to about 0.203 mm (about 0.003 to about 0.008). The coating may be selected from a number of commercially-available materials such as polyurethanes, fluorinated polyurethanes and silicones which are cured by heat or they may be selected from materials that are cured by ultraviolet (UV) or electron beam (EB) radiation. Such UV/EB cured materials fall under the general class of acrylates and modified acrylates that contain fluorine, silicone, epoxy, polyester, polyether or caprolactone residues or functional groups. The particular coating material selected will depend primarily on the degree of abrasion resistance required. Application of the liquid, heat- or UV/EB-curable precursor of the abrasion resistant coating may be carried out according to conventional procedures and usually is accomplished on a roll coating machine. The thickness of the coating applied to a film generally is about 0.0076 to about 0.051 mm (about 0.0003 to about 0.002 inch) or about 0.0127 mm (about 0.0005 inch). Primers or tie layers can also be used between the hardcoat and film layer to promote adhesion.

These coatings may be applied in a manner similar to the application of paints. The coatings exist either as predominantly undiluted material with very little volatile content or as solvent- or water-based materials. In addition to being applied to a film that can be laminated to the structure as part of the process, they may be applied directly to the finished product. Application may be carried out by a variety of techniques such as roll, paint, spray, mist, dip and the like.

EXAMPLES

Example 1

Extruded sheet samples of 0.118 inch thickness were made from Radici's Radicron 1480 (NPG-modified polyester, now available from Artenius, a division of La Seda de Barcelona under the Radicron brand name) by drying the resin at about 160 deg F. overnight then feeding the resin to an extruder—a non-vented MPM extrusion line with a L/D of 25:1 fitted with a 2.5 inch barrier-type screw. The extrusion conditions included a straight profile temperature set point of about 490 deg F. which resulted in a production rate of approximately 100 pounds per hour. The materials were extruded through a 20 inch coat hanger die onto a 3 roll stack configuration. The roll temperatures were set to cool the sheet while minimizing stress with cooling temperature set points of 80 deg F. on the top roll, 120 deg F. on the middle roll and 150 deg F. on the bottom roll.

Example 2

Extruded sheet samples of 0.118 inch thickness were made from Spectar 14471 (CHDM-modified polyester) by drying the resin at about 160 deg F. overnight then feeding the resin to an extruder—a non-vented MPM extrusion line with a L/D of 25:1 fitted with a 2.5 inch barrier-type screw. The extrusion conditions included a straight profile temperature set point of about 490 deg F. which resulted in a production rate of approximately 100 pounds per hour. The materials were extruded through a 20 inch coat hanger die onto a 3 roll stack configuration. The roll temperatures were set to cool the sheet while minimizing stress with cooling temperature set points of 80 deg F. on the top roll, 120 deg F. on the middle roll and 150 deg F. on the bottom roll. The extruded sheet from Examples 1 and 2 were then analyzed with the following results:

TABLE 1

Analytical Test Results for Polyester Samples

| | Chemical Composition (NMR) | | | | | Glass Transition | Inherent | Molecular Weight | | |
|---|---|---|---|---|---|---|---|---|---|---|
| | TPA | EG | CHDM | NPG | DEG | Temperature (DSC) | Viscosity | Distribution (GPC) | | |
| | mol % | mol % | mol % | mol % | mol % | deg C. | dL/g | Mn | Mw | Mv |
| Example 1 | 100 | 69.2 | 0 | 29.1 | 1.7 | 78 | 0.652 | 19378 | 46716 | 74080 |
| Example 2 | 100 | 68.5 | 30.4 | 0 | 1.1 | 81 | 0.728 | 18288 | 40158 | 62784 |

The polyester composition analysis was performed by $^1$H NMR Spectrometry where the spectra were recorded on a JEOL Eclipse 600 MHz spectrometer using a 70/30 (v/v) mixture of chloroform-d and trifluoroacetic acid and where 64 scans were taken using a 90 degree pulse and a 15 second relaxation delay. "TPA" refers to terephthalic acid, "EG" refers to ethylene glycol, "CHDM" refers to cyclohexanedimethanol and "DEG" refers to diethylene glycol, a byproduct formed during the polymerization reaction.

The glass transition temperatures were determined using a TA Instruments 2950 differential scanning calorimeter (DSC) at a scan rate of 20° C./minute according to ASTM D3418. The readings were taken from the second DSC scan in order to remove heat history effects.

The polyester inherent viscosities were determined in 60/40 (wt/wt) phenol/tetrachloroethane at a concentration of 0.5 g/100 ml at 25° C. as generally described in ASTM method D2857-95.

The molecular weight analysis by GPC was performed in methylene chloride, at ambient temperature and at a flow rate of 1 ml/min. Sample solutions were prepared by dissolving about 28 mg of polymer in 25 ml of methylene chloride, and adding 20 µl of toluene as a flow-rate marker. 100 µl of this solution was injected onto a column set consisting of two Polymer Laboratories 5 µm PLgel Mixed-C columns and a matching guard column. The molecular weight of the eluted polymer as a function of elution volume was determined with a Wyatt Technology miniDawn TriStar three angle light scattering detector, together with an Optilab DSP differential refractometer, also from Wyatt. The molecular weight distribution was calculated by integration of the refractive index chromatogram, using the molecular weight versus elution volume information from the light scattering as the column calibration.

Examples 3-13

The samples described in Examples 1 and 2 were then subjected to extended heat histories in a thermocompressive lamination process to discover the relationship between adhesive strength versus lamination time for each category of materials. A 12 inch square layup was assembled according to the following layered arrangement—a layer of blotter paper on bottom, a 60 mil rubber pad, a polished metal caul sheet, Sappi release paper with a "patent" high gloss finish, 0.118 inch extruded sheet sample, a second 0.118 inch extruded sheet sample (to form a laminate) and continuing this layup pattern in reverse (release paper, caul sheet, rubber pad, blotter paper). It should be also be noted that a 0.001 inch×1 inch×12 inch strip of polyethylene masking was inserted between the two extruded sheet samples along one edge to prevent lamination in this localized area. This "pre-crack" aids in proper adhesion measurement. J-type thermocouple wires were also inserted between the two extruded sheet samples to obtain a time-series history of the interfacial sheet temperature.

The entire layup was placed in a Carver press at 221 deg F. platen temperature and 20,000 $lb_f$ (about 139 psi panel pressure) for 2 minutes before the cooling water flow was opened. This process was then repeated with new sheet to make additional laminates at 3, 4, 5, 6, 7, 8 and 10 minutes of total lamination heating time as shown in Table 2, below.

The results show that NPG-modified polyesters form a sheet to sheet interfacial bond more quickly than CHDM-modified polyesters. Although the glass transition temperature of the neopentyl glycol-modified polyester is slightly lower than the CHDM-modified polyester, this minor difference does not account for significant difference in lamination time. Further, the peak temperature shows that heat transfer between the two materials was also equivalent. Laminates made from NPG-modified polyesters translate to a faster cycle time and therefore a more efficient manufacturing process than CHDM-modified polyesters.

Examples 14-25

In commercial decorative laminate manufacturing, some articles are manufactured using the layup described in Examples 3-13. However, there are times when a "glass sheen" woven PET fabric is also used to aid air removal from between the sheet to sheet interface. To discover the effect of utilizing this fabric, the samples described in Examples 1 and 2 were subjected to extended heat histories in a thermocompressive lamination process to again discover the relationship between adhesive strength versus lamination time for each category of materials. A 12 inch square layup was assembled according to the following layered arrangement—a layer of blotter paper on bottom, a 60 mil rubber pad, a polished metal caul sheet, Sappi release paper with a "patent" high gloss finish, 0.118 inch extruded sheet sample, a piece of glass sheen (woven PET fabric), a second 0.118 inch extruded sheet sample (to form a laminate) and continuing this layup pattern in reverse (release paper, caul sheet, rubber pad, blotter paper). It should be also be noted that a 0.001 inch×1 inch×12 inch strip of polyethylene masking was inserted between the two extruded sheet samples along one edge to prevent lamination in this localized area. This "pre-crack" aids in proper adhesion measurement. J-type thermocouple wires were also inserted between the two extruded sheet samples to obtain a time-series history of the interfacial sheet temperature.

The entire layup was placed in a Carver press at 221 deg F. platen temperature and 20,000 $lb_f$ (about 139 psi panel pressure) for 3 minutes before the cooling water flow was opened. This process was then repeated with new sheet to make additional laminates at 4, 5, 6, 7, 8, 9 and 10 minutes of total lamination time as shown in Table 3, below.

TABLE 2

Characterization of Laminates Made without Encapsulated Inclusions

| Example # | Extruded Sheet Source | Lamination Heating Time (minutes) | Interfacial Adhesion (J/m^2) | Peak Temperature (deg C.) |
|---|---|---|---|---|
| Example 3 | NPG copolyester from Example 1 | 2 | 7 | 72.8 |
| Example 4 | NPG copolyester from Example 1 | 3 | 68 | 81.9 |
| Example 5 | NPG copolyester from Example 1 | 4 | 424 | 90.3 |
| Example 6 | NPG copolyester from Example 1 | 5 | 528 | 95.3 |
| Example 7 | NPG copolyester from Example 1 | 6 | 773 | 98.1 |
| Example 8 | NPG copolyester from Example 1 | 7 | 974 | 99.3 |
| Example 9 | CHDM copolyester from Example 2 | 5 | 25 | 92.7 |
| Example 10 | CHDM copolyester from Example 2 | 6 | 190 | 99.0 |
| Example 11 | CHDM copolyester from Example 2 | 7 | 640 | 100.4 |
| Example 12 | CHDM copolyester from Example 2 | 8 | 679 | 100.4 |
| Example 13 | CHDM copolyester from Example 2 | 10 | 798 | 102.2 |

The interfacial adhesion was measured according to a modified version of the Dual Cantilever Beam test (ASTM D3433). ASTM D3433 was initially written to measure the fracture energies of adhesives on metallic beams and was modified herein such that no adhesive was utilized, the beams were thermoplastic polyesters and multiple pulls were averaged to improve the test method precision. Test coupons of 1 inch×6 inch dimensions were cut from the 12 inch laminates such that the 1 inch×1 inch polyethylene masking remained on one end (FIG. 1). The area with the masking is where polyester to polyester lamination was prevented to aid proper adhesion measurement. Two holes were drilled and tapped (threaded) on each side of the test bar on the non-laminated end. A hinge was then attached to each side and the free end of each hinge was clamped to a MTS Model 5565 Instron tensile measurement instrument such that the pull was oriented perpendicular to the laminate face (perpendicular to the 1 inch×6 inch face). One "pull" consisted of the lever arms bending and spreading apart with a crosshead speed of 0.4 inches per minute until the force at yield was measured. The force at yield constituted mechanically-induced delamination at the sheet to sheet interface which was visually detectable. Ten such pulls were measured and the average calculated as shown in Table 2.

TABLE 3

Characterization of Laminates Made with Encapsulated Glass Sheen Fabric

| Example # | Extruded Sheet Source | Lamination Heating Time (minutes) | Interfacial Adhesion (J/m^2) | Peak Temperature (deg C.) |
|---|---|---|---|---|
| Example 14 | NPG copolyester from Example 1 | 3 | 54 | 79.6 |
| Example 15 | NPG copolyester from Example 1 | 4 | 80 | 85.8 |
| Example 16 | NPG copolyester from Example 1 | 5 | 156 | 90.4 |
| Example 17 | NPG copolyester from Example 1 | 6 | 198 | 94.5 |
| Example 18 | NPG copolyester from Example 1 | 7 | 371 | 99.4 |
| Example 19 | NPG copolyester from Example 1 | 8 | 668 | 100.2 |
| Example 20 | NPG copolyester from Example 1 | 5 | 0 | 91.3 |
| Example 21 | CHDM copolyester from Example 2 | 6 | 101 | 96.5 |
| Example 22 | CHDM copolyester from Example 2 | 7 | 226 | 98.6 |
| Example 23 | CHDM copolyester from Example 2 | 8 | 314 | 100.9 |
| Example 24 | CHDM copolyester from Example 2 | 9 | 488 | 100.7 |
| Example 25 | CHDM copolyester from Example 2 | 10 | 553 | 101.3 |

The interfacial adhesion was measured using the modified Dual Cantilever Beam test method described in Examples 3-13.

Similar to Examples 3-13, Table 3 shows that NPG-modified polyesters with encapsulated glass sheen fabric also form a sheet to sheet interfacial bond more quickly than CHDM-modified polyesters with encapsulated glass sheen fabric. Laminates made from NPG-modified polyesters therefore translate to a faster cycle time and therefore a more efficient manufacturing process than CHDM-modified polyesters with or without encapsulating glass sheen fabric.

The invention has been described in detail with particular reference to preferred embodiments thereof, but it will be understood that variations and modifications can be effected within the spirit and scope of the invention.

We claim:

1. A thermoplastic article obtained by contacting a laminate comprising a first sheet material and a second sheet material with heat and pressure using a heated element which results in the simultaneous bonding of the sheet material;

wherein the first and second sheet materials are formed from a copolyester having an inherent viscosity of 0.5 to 1.2 dL/g, when measured at 25° C. using 0.50 grams of polymer per 100 mL of a solvent consisting of 60 weight percent phenol and 40 weight percent tetrachloroethane comprising:

(i) diacid residues comprising at least 80 mole percent terephthalic acid residues; and (ii) diol residues consisting essentially of ethylene glycol residues and neopentyl glycol residues in a mole ratio of ethylene glycol to neopentyl glycol of from about 38:62 to 88:12, wherein the laminate has an interfacial adhesion at least about 1.5 times greater than a laminate with diol residues consisting essentially of ethylene glycol residues and 1,4-cyclohexanedimethanol residues in a mole ratio of ethylene glycol to 1,4-cyclohexanedimethanol of from about 38:62 to 88:12.

2. A thermoplastic article according to claim 1 wherein the upper and lower sheet materials have a thickness in the range of about 0.38 to about 12.70 mm.

3. A thermoplastic article according to claim 1 wherein the upper sheet material has a thickness in the range of about 0.38 to 12.70 mm and the copolyester has an inherent viscosity of 0.6 to 0.9 dL/g, when measured at 25° C. using 0.50 grams of polymer per 100 mL of a solvent consisting of 60 weight percent phenol and 40 weight percent tetrachloroethane.

4. A thermoplastic article according to claim 3 wherein the article includes an abrasion-resistant coating on one or both of the outside surfaces of the article.

5. A thermoplastic article according to claim 4 wherein the abrasion resistant coating is provided as a film having a thickness in the range of about 0.0025 to 0.381 mm.

6. A thermoplastic article according to claim 4 wherein the abrasion resistant film is provided as a fluorinated hydrocarbon, poly(perfluoroethylene), or oriented poly(ethylene terephthalate) film having a thickness in the range of about 0.0025 to 0.381 mm.

7. A thermoplastic article according to claim 4 wherein the abrasion resistant coating is a heat-, ultraviolet- or electron beam-cured material on a film of poly(vinyl chloride), PETG copolyester, poly(ethylene terephthalate), poly(methyl methacrylate) or polycarbonate.

8. A thermoplastic article according to claim 3 wherein the upper sheet material has a thickness of 1.27 to 6.35 mm.

9. A thermoplastic article according to claim 7 wherein the abrasion resistant coating is a heat-cured silicone, polyurethane or fluorinated polyurethane or a ultraviolet- or electron beam-cured material selected from modified acrylates containing polyurethane, fluorinated polyurethane, silicone, epoxy, polyester, polyether or caprolactone residues.

10. A thermoplastic article according to claim 2 wherein the upper sheet material is transparent and the lower sheet material is translucent or opaque.

11. A thermoplastic article according to claim 1, wherein at least one of the sheets has a decorative texture or design on its surface.

12. A thermoplastic article according to claim 1, further comprising an insert adhered to one of said first sheet material or second sheet material or encapsulated between said first sheet material or second sheet material.

13. A thermoplastic article according to claim 12, wherein the insert is selected from the group consisting of films, fabric, metallic wire, rod, bar, mesh, decorative amorphous metallic surfaces, wood, stone, paper, printed images, vegetation, wood, wood chips, grasses, thatch, flowers, flower petals, wheat, grains, natural papers, glass, crushed glass, pebbles, moss, and the like, or at least one electrically energized device comprising light emitting capacitors (LEC's), light emitting diodes (LED's), printed circuit boards or paper that emit light when energized, electrochromic layers, photovoltaics, transmitters, receivers, antennas, electromagnets, electrodes and smart sensors.

14. A thermoplastic article according to claim 13, wherein the article is selected from the group consisting of counter tops, table tops, cabinet doors, game boards, toys, panels for shower stalls, hot tubs, marker boards, indoor signs, outdoor signs, vanity tops, flooring, billboard signage, backlit bus advertisement, street furniture, bus shelters, visual merchandizing displays, flooring, ceilings, kiosks, smart sensors, decorative walls, partitions, glazing applications, and skylights.

* * * * *